(12) United States Patent
Keys et al.

(10) Patent No.: US 9,032,605 B2
(45) Date of Patent: May 19, 2015

(54) APPARATUS, SYSTEM AND METHOD FOR MANUFACTURING METAL PARTS

(75) Inventors: James F. Keys, Northville, MI (US); Gary L. Gembala, Strongsville, OH (US)

(73) Assignee: Shiloh Industries, Inc., Valley City, OH (US)

( * ) Notice: Subject to any disclaimer, the term of this patent is extended or adjusted under 35 U.S.C. 154(b) by 784 days.

(21) Appl. No.: 13/375,734

(22) PCT Filed: Jun. 9, 2010

(86) PCT No.: PCT/US2010/037876
§ 371 (c)(1),
(2), (4) Date: Dec. 1, 2011

(87) PCT Pub. No.: WO2010/144517
PCT Pub. Date: Dec. 16, 2010

(65) Prior Publication Data
US 2012/0067104 A1 Mar. 22, 2012

Related U.S. Application Data

(60) Provisional application No. 61/185,468, filed on Jun. 9, 2009.

(51) Int. Cl.
*B21D 43/00* (2006.01)
*B23P 23/00* (2006.01)
(Continued)

(52) U.S. Cl.
CPC ............ *B21D 35/003* (2013.01); *B21D 43/006* (2013.01); *B21D 47/04* (2013.01); *B23P 2700/50* (2013.01); *B23P 19/10* (2013.01); *B21D 53/88* (2013.01); *B23K 37/047* (2013.01)

(58) Field of Classification Search
CPC .... B21D 22/00; B21D 35/003; B21D 35/005; B21D 35/006; B21D 35/007; B21D 39/03; B21D 43/006; B21D 43/02; B21D 43/026; B21D 43/22; B21D 47/04; B22D 11/062; B22D 11/0628; B23K 37/047; B23P 19/10; B23P 2700/14; B23P 2700/50
See application file for complete search history.

(56) References Cited

U.S. PATENT DOCUMENTS 4,036,056 A * 7/1977 Saunders ........................ 72/329
5,623,849 A 4/1997 Goff, Jr. et al.
(Continued)

FOREIGN PATENT DOCUMENTS

CN 101357436 A 2/2009
DE 1288548 B 2/1969
(Continued)

OTHER PUBLICATIONS

WO2013/153229A1 Translation Document.*
(Continued)

*Primary Examiner* — Alexander P Taousakis
(74) *Attorney, Agent, or Firm* — Reising Ethington P.C.

(57) ABSTRACT

An apparatus, system and method for manufacturing metal parts, where input material is received from several material sources, multiple metal parts are produced at the same time, and the multiple metal parts may be provided to a downstream operation for subsequent processing. According to an exemplary embodiment, unwinding apparatuses unwind metal coils and provide three separate metal strips to coil-fed metal forming press. The coil-fed metal forming press then creates three separate blanks or metal parts at the same time. Next, a part transfer apparatus retrieves the three metal parts from an output side of coil-fed metal forming press, and presents them to part assembly apparatus, which may include a laser welder or other piece of equipment. Once the metal parts are properly positioned, part assembly apparatus can create a metal part assembly from the three individual blanks.

21 Claims, 4 Drawing Sheets

(51) Int. Cl.
  *B21D 35/00*   (2006.01)
  *B23P 19/10*   (2006.01)
  *B21D 53/88*   (2006.01)
  *B23K 37/047*  (2006.01)
  *B21D 47/04*   (2006.01)

(56) References Cited

U.S. PATENT DOCUMENTS

| | | | |
|---|---|---|---|
| 7,137,201 B2 * | 11/2006 | Brodt et al. | 29/897.2 |
| 2003/0115730 A1 * | 6/2003 | Ament et al. | 29/17.3 |
| 2003/0116543 A1 * | 6/2003 | Battaglia | 219/121.67 |
| 2007/0180881 A1 * | 8/2007 | Ingvarsson | 72/169 |
| 2011/0094282 A1 * | 4/2011 | Overrath et al. | 72/342.1 |
| 2011/0283851 A1 * | 11/2011 | Overrath et al. | 83/15 |
| 2012/0061453 A1 * | 3/2012 | Vogt et al. | 228/160 |
| 2014/0144198 A1 * | 5/2014 | Potocki et al. | 72/342.1 |

FOREIGN PATENT DOCUMENTS

| | | | | |
|---|---|---|---|---|
| DE | WO2013/153229 A1 * | 4/2013 | | B29C 70/08 |
| JP | S63241119 A | 10/1988 | | |
| JP | 2001-1157 * | 9/2001 | | B23K 11/11 |
| JP | 2004223551 A | 8/2004 | | |
| KR | 100510205 B1 | 8/2005 | | |
| WO | WO03000440 A1 | 1/2003 | | |

OTHER PUBLICATIONS

JP2001-1157 Translation Document.*

Extended European Search Report dated Dec. 8, 2014, 7 pages.

Written Opinion & International Search Report for PCT/US10/037876, Jan. 25, 2011, 7 pages.

* cited by examiner

US 9,032,605 B2

APPARATUS, SYSTEM AND METHOD FOR MANUFACTURING METAL PARTS

REFERENCE TO RELATED APPLICATIONS

This application claims the benefit of U.S. Provisional Ser. No. 61/185,468 filed on Jun. 9, 2009.

FIELD

The present invention generally relates to manufacturing metal parts and, more particularly, to receiving metal material from multiple sources and blanking, stamping, drawing and/or otherwise processing or forming the metal material with a single machine so that multiple metal parts are formed.

BACKGROUND

Some manufacturing systems are designed such that a single metal coil is fed to a blanking press, the blanking press is cycled in order to individually produce a production quantity or lot of metal blanks, the metal blanks are then stored as inventory and/or transferred to another location, and finally the metal blank inventory is processed by a subsequent operation, such as a stamping, welding, fabrication, assembly, or other operation.

Other manufacturing systems are based on "takt time" or "cycle time," as is appreciated by those skilled in the art. Takt time generally refers to the amount of time that is allowed per cycle during a manufacturing process, and it typically sets the pace of the manufacturing process. In a vehicle assembly process, for example, vehicles are assembled on a line and are advanced from station to station after a certain amount of time; this period of time may be referred to as the "takt time."

SUMMARY

According to one aspect, there is provided a system for manufacturing metal parts, comprising: a first material source, a second material source, and a coil-fed metal forming press. The first material source provides a first metal strip from a first metal coil. The second material source provides a second metal strip from a second metal coil. The coil-fed metal forming press receives the first metal strip from the first material source and the second metal strip from the second material source, and the coil-fed metal forming press forms both the first and second metal strips in a single forming operation.

According to another aspect, there is provided a system for manufacturing metal parts, comprising: a plurality of metal coils, a first processing apparatus, a part transfer apparatus, and a second processing apparatus. The plurality of metal coils provides a plurality of metal strips. The first processing apparatus receives the plurality of metal strips from the plurality of metal coils and transforms the plurality of metal strips into a plurality of metal parts. The part transfer apparatus transfers the plurality of metal parts from the first processing apparatus. The second processing apparatus receives the plurality of metal parts from the part transfer apparatus and creates a metal part assembly from the plurality of metal parts.

According to another aspect, there is provided a method for manufacturing metal parts. The method comprises the steps of: (a) providing a first metal strip from a first metal coil to a coil-fed metal forming press; (b) providing a second metal strip from a second metal coil to the coil-fed metal forming press; (c) forming both the first metal strip and the second metal strip with the coil-fed metal forming press in a single forming operation such that a plurality of metal parts are simultaneously formed; and (d) transferring the plurality of metal parts from the coil-fed press to a subsequent operation according to an overall takt time for the manufacturing method.

DESCRIPTION OF THE DRAWINGS

A preferred exemplary embodiment of the invention will hereinafter be described in conjunction with the appended drawings, wherein like designations denote like elements, and wherein.

DESCRIPTION OF PREFERRED EMBODIMENT

Figure 1A:
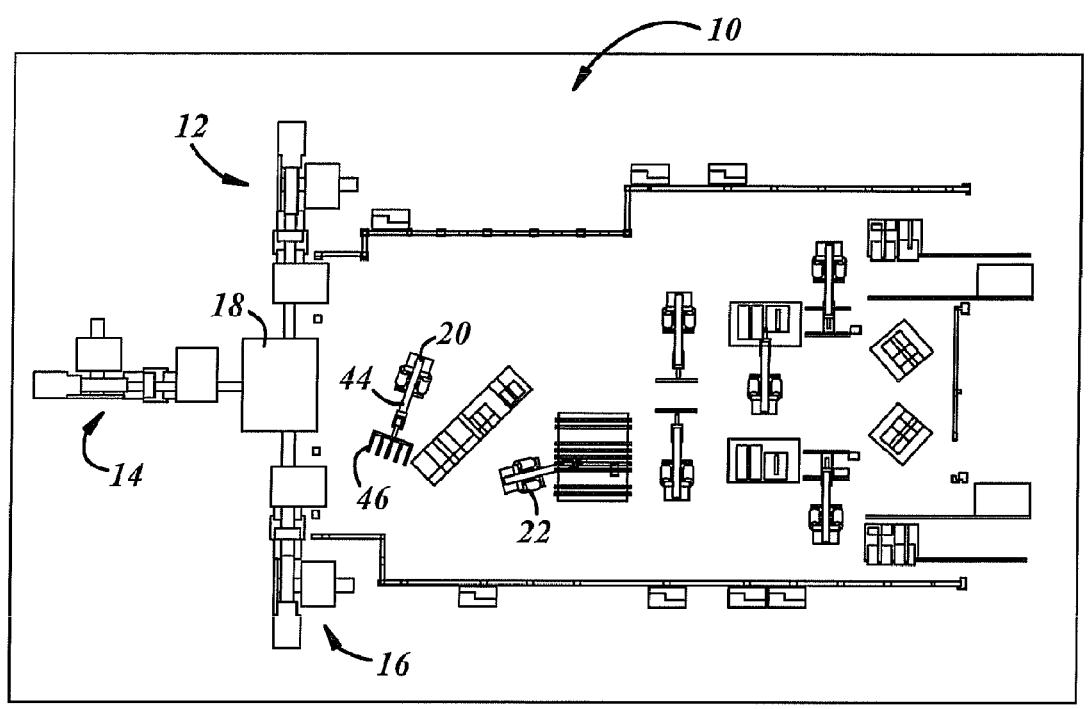
FIG. 1A is a top view of an exemplary system for manufacturing metal parts.
Figure 1B:
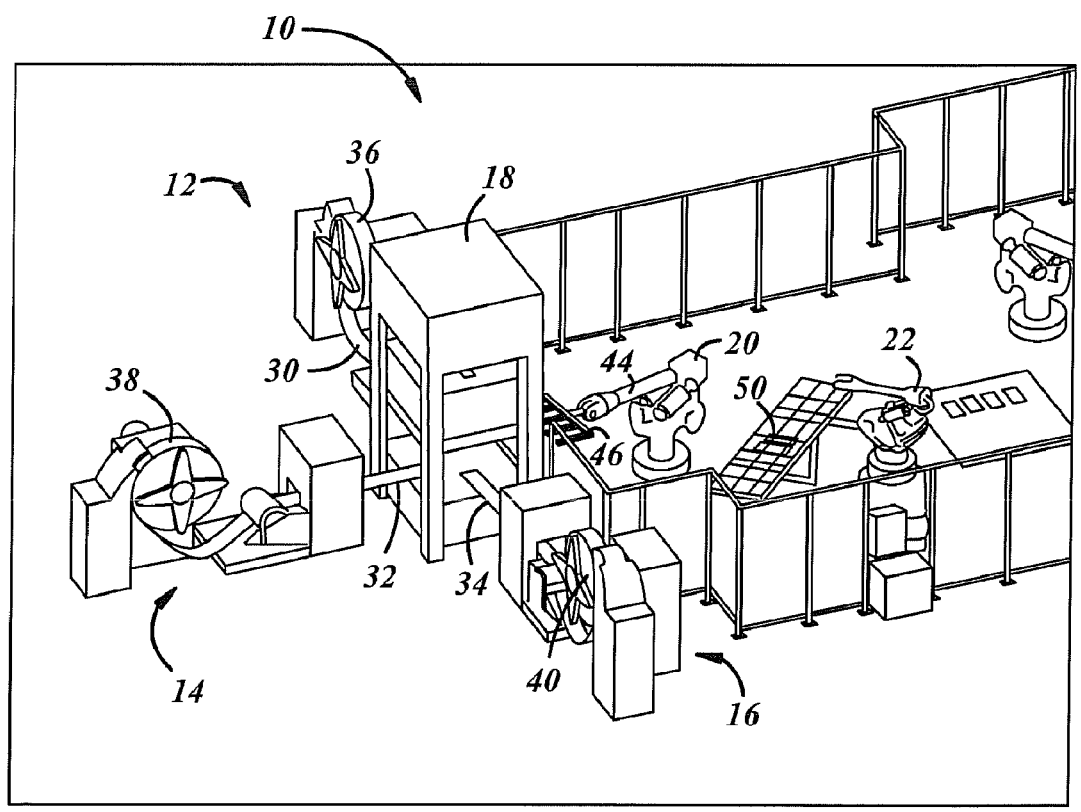
FIG. 1B is a perspective view of the exemplary system from FIG. 1A.
Figure 1C:
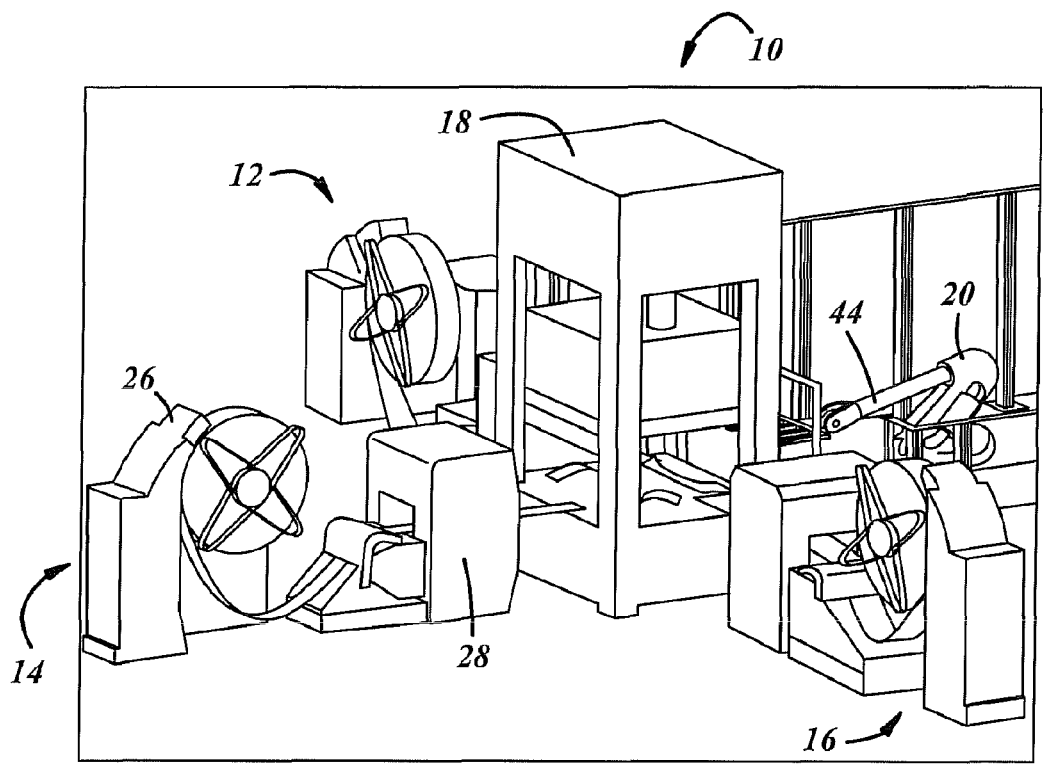
FIG. 1C is an enlarged perspective view of a section of the system from FIG. 1A; namely, the section of the system where a number of metal coils simultaneously provide metal strips to a coil-fed metal forming press.
Figure 1D:
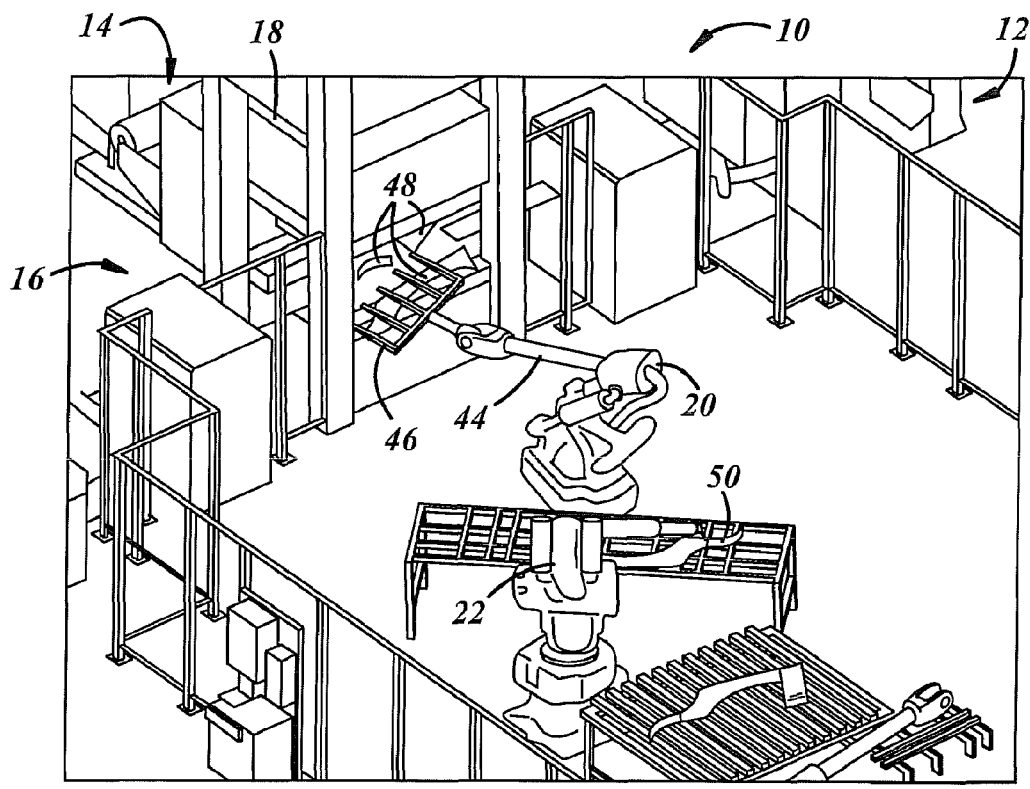
FIG. 1D is an enlarged perspective view of a section of the system from FIG. 1A; namely, the section of the system where a part transfer apparatus transfers metal parts from a coil-fed metal forming press to a part assembly apparatus.

The apparatus, system and method described herein generally receive metal material from multiple material sources (e.g., two or more metal coils), process the metal material in a single machine or apparatus (e.g., a blanking, stamping, drawing or other type of metal forming press), and then provide the resulting metal parts for subsequent operations. By coordinating the operation of the system so that multiple metal parts are manufactured at the same time and then presented to the next station as they are needed (e.g., according to an overall "takt time"), the system may enjoy certain gains in efficiency and cost reductions. Traditionally, a single source provides input material to a press and the press processes the material to create one or more processed parts. The parts are then stored as inventory until a downstream operation, such as a welding operation, requires them. The present system and method may be able to improve the efficiency of such an operation by coordinating the efforts of all of the pieces of equipment and steps involved so that a first processing apparatus provides a second processing apparatus with parts as they are needed. Not only can inventory-related costs be reduced, but the amount of cycle time required to extract multiple parts may be reduced as all of the parts are coming from the same machine or apparatus.

According to the exemplary embodiment shown in FIGS. 1A-D, the manufacturing system 10 generally includes material sources 12-16, a first processing apparatus 18, a part transfer apparatus 20, and a second processing apparatus 22. It should be appreciated that the exemplary embodiments shown in the drawings and described in the following paragraphs are only some of the possibilities and that other setups and arrangements could be used instead.

Material sources 12-16 provide manufacturing system 10 with material or input for manufacturing and, according to one embodiment, include three separate unwinding apparatuses that provide metal strips 30-34 from metal coils 36-40. In the embodiment shown here, each of the unwinding apparatuses 12-16 includes a coil holder 26 for rotatably holding or maintaining a metal coil and an uncoiling device 28 for pulling and/or pushing material from a metal coil (see FIG. 1C), although other devices may be used instead. The unwinding apparatuses 12-16 may provide the system with metal strips that are all the same or they may provide the system with metal strips that are different. For instance, unwinding apparatus 12 may provide manufacturing system 10 with a metal strip 30 from a first metal coil 36 that has a certain composition, quality, thickness or gauge, and/or width, while unwinding apparatus 14 may provide the system with a metal strip 32 from a second metal coil 38 that is different in one or more of these characteristics. If first processing apparatus 18 is producing different parts, then it is likely that material sources 12-16 will provide different input material. If, on the other hand, first processing apparatus 18 is producing multiple units or copies of the same part, then material sources 12-16 will likely provide the apparatus with the same input material.

According to an exemplary embodiment where first processing apparatus 18 is producing different parts in a single forming operation, material source 12 may provide a first metal strip 30 that is made from galvaneel steel and is 0.4 mm-0.6 mm thick; material source 14 may provide a second metal strip 32 that is made from cold-rolled steel and is 0.6 mm-0.8 mm thick, and material source 16 may provide a third metal strip 34 that is made from hot-dipped galvanized steel and is 0.5 mm-1.0 mm thick. Other suitable materials could include hot-rolled steel, electro-plated steel, other ferrous and non-ferrous metals (e.g., aluminum), plastics, etc., and the width of the coils could vary as well. The preceding example is, of course, only exemplary as material sources 12-16 may provide the system with any number of different materials and is certainly not limited to the exemplary materials provided there. It should be appreciated that "metal strip," as used herein, broadly includes any strip, sheet, belt, band or other thin piece of metal and is not limited to any particular embodiment. For instance, it is possible for metal strips 30-34 to include a single layer of thin sheet metal, or to include multiple layers of sheet metal brought together in a laminated form (e.g., a sound-damped steel laminate).

As demonstrated in the attached drawings, each of the material sources 12-16 has an unwinding apparatus that carries a metal coil or roll 36-40 and provides a long or continuous metal strip 30-34 to a different side of first processing apparatus 18; which in this embodiment is a blanking press, although it may be any type of metal forming press. This type of arrangement differs from those systems where multiple coils are fed into the same side of a press but are layered one-on-top-of-another. In the present system, metal parts with different sizes and/or shapes may be blanked, stamped, drawn or otherwise formed at the same time; in a layered or one-on-top-of-another system, only a single type of part can be processed at a time, even though multiple units can be made in one cycle. Certain advantages may be enjoyed by making multiple and different parts at one time, as will be explained below in more detail. Although the embodiments illustrated in FIGS. 1A-3B all show three separate material sources 12-16 providing first processing apparatus 18 with three separate metal strips 30-34, it should be appreciated that more or fewer material sources may be used, and that material sources other than unwinding apparatuses are possible. Some alternative embodiments include, for example, providing first processing apparatus 18 with multiple metal blanks instead of multiple metal strips, and using two or four material sources instead of three.

First processing apparatus 18 receives input material from several material sources 12-16 and then shears, blanks, stamps, forms, draws or otherwise forms or processes the input material to simultaneously produce multiple metal parts. In this particular embodiment, first processing apparatus 18 is a coil-fed metal forming press (e.g., a blanking press) that receives metal strips 30-34 from several metal coils 36-40 and then blanks multiple metal parts in a single blanking operation. Thus, in a single cycle of metal forming press 18, multiple metal blanks can be formed at the same time. It should be appreciated that first processing apparatus 18 could instead include a cut-off or shearing station, stamping press, forming press, drawing press, or any other suitable piece of equipment known in the art. The exemplary blanking press 18 that is shown in the drawings generally has four sides, where three of the sides are input sides that receive input material from material sources 12-16 and a fourth side is an output side that is dedicated to part removal. As appreciated by those skilled in the art, first processing apparatus 18 may or may not include features for maintaining or holding the input material or work piece during the manufacturing process. If first processing apparatus 18 is a blanking press, then the task of stabilizing and maintaining the input material in place may fall on the different unwinding apparatuses 12-16; if first processing apparatus 18 is a stamping or drawing press, for instance, then stabilizing features like material webs, fingers, etc. for maintaining the input material in place may be part of the stamping press itself.

Part transfer apparatus 20 removes the metal parts from first processing apparatus 18 and presents them to second processing apparatus 22, which can be one of a variety of different machines including various types of welding machines. Any type of suitable part transfer or part extraction apparatus may be used to transfer or remove parts from the first processing apparatus 18 to the second processing apparatus 22. This includes, for example, a robotic extractor 44 that has magnetic, suction or some other type of gripping or grasping features 46 (see FIG. 1D). In the exemplary embodiment illustrated in the drawings, robotic extractor 44 has an arm equipped with a number of suction features 46 that are used to simultaneously engage and remove metal parts 48 from a dedicated part removal side of first processing apparatus 18 and to present the metal parts to second processing apparatus 22, which in this case is a laser welding station. By transferring multiple metal parts at one time, manufacturing system 10 may be able to reduce cycle times and costs associated with traditional systems that require several pieces of extraction equipment to perform these tasks. Again, it should be recognized that the robotic extractor 44 shown in the drawings is only an exemplary embodiment of part transfer apparatus 20 and that other pieces of equipment, such as conveyors, etc. may be used instead, as well as manual part removal and transfer. It is also possible for part transfer apparatus 20 to include several components, devices, etc. For instance, two or more robotic extractors and/or other devices could work together in order to transfer metal parts 48 from the first processing apparatus 18 to the second processing apparatus 22.

According to a different embodiment, part transfer apparatus 20 may simply be used to extract metal parts 48 from first processing apparatus 18, without conveying them to some other processing apparatus. For example, second processing apparatus 22 could be removed from the overall system such that first processing apparatus 18 simply forms metal parts 48 from multiple metal strips 30-34, without sending them on to some downstream assembly operation. Put differently, it is not necessary for manufacturing system 10 to include both first and second processing apparatuses 18 and 22, although such an arrangement is preferable.

Second processing apparatus 22 receives multiple metal parts 48 from part transfer apparatus 20, and then processes those parts by performing some type of operation on them, such as welding, additional forming, assembling, etc. In an exemplary embodiment, second processing apparatus 22 is a part assembly apparatus that receives metal parts 48 created by the coil-fed metal forming press 18 and then assembles them in order to create a metal part assembly 50. Thus, the metal forming press 18 produces the individual blanks, stampings or other metal parts that are needed to create a certain assembly, and part assembly apparatus 22, which may include a laser welding head or other piece of suitable equipment, produces the laser welded assembly. Apparatuses 18-22 may be synchronized such that they operate according to an overall takt-time for the manufacturing method. Little to no inventory or waste is generated, as the coil-fed metal forming press 18 only produces those parts that are required by the part assembly apparatus 22 and the parts are provided just as they are required (i.e., takt time production). Second processing apparatus 22 does not need to be a laser welder, as it could be any suitable piece of equipment. For example, the first processing apparatus 18 may be a shearing station or a blanking press while the second processing apparatus 22 is a stamping press, drawing press, etc.

It is also possible for manufacturing system 10 to include additional pieces of equipment. For instance, manufacturing system 10 may include a blanking press, a stamping press, and a laser welder. In such a case, input material is first blanked in multiple copies by the blanking press, the multiple blanks are then transferred to and simultaneously stamped by the stamping press, and then the multiple stampings are then arranged and laser welded together by a laser welding apparatus to form a metal part assembly. In another embodiment, manufacturing system 10 has a blanking press, an adhesive station and/or a welder, and a stamping press. The blanking press can blank out metal base panels and sound-damping metal inserts or patches, while the adhesive station applies a viscoelastic sound-damping adhesive to the recently-blanked base panel and/or sound-damping patches. Once the sound-damping patches are applied to the base panel or underlying structure that is to be damped, one or more welds may be added before the assembly is stamped together in the stamping press. There is no limit to the number, combination or sequence of devices, apparatuses or other pieces of equipment that may be part of manufacturing system 10. Other embodiments and arrangements will be apparent to the skilled artisan and could be used herein.

Figure 2A:
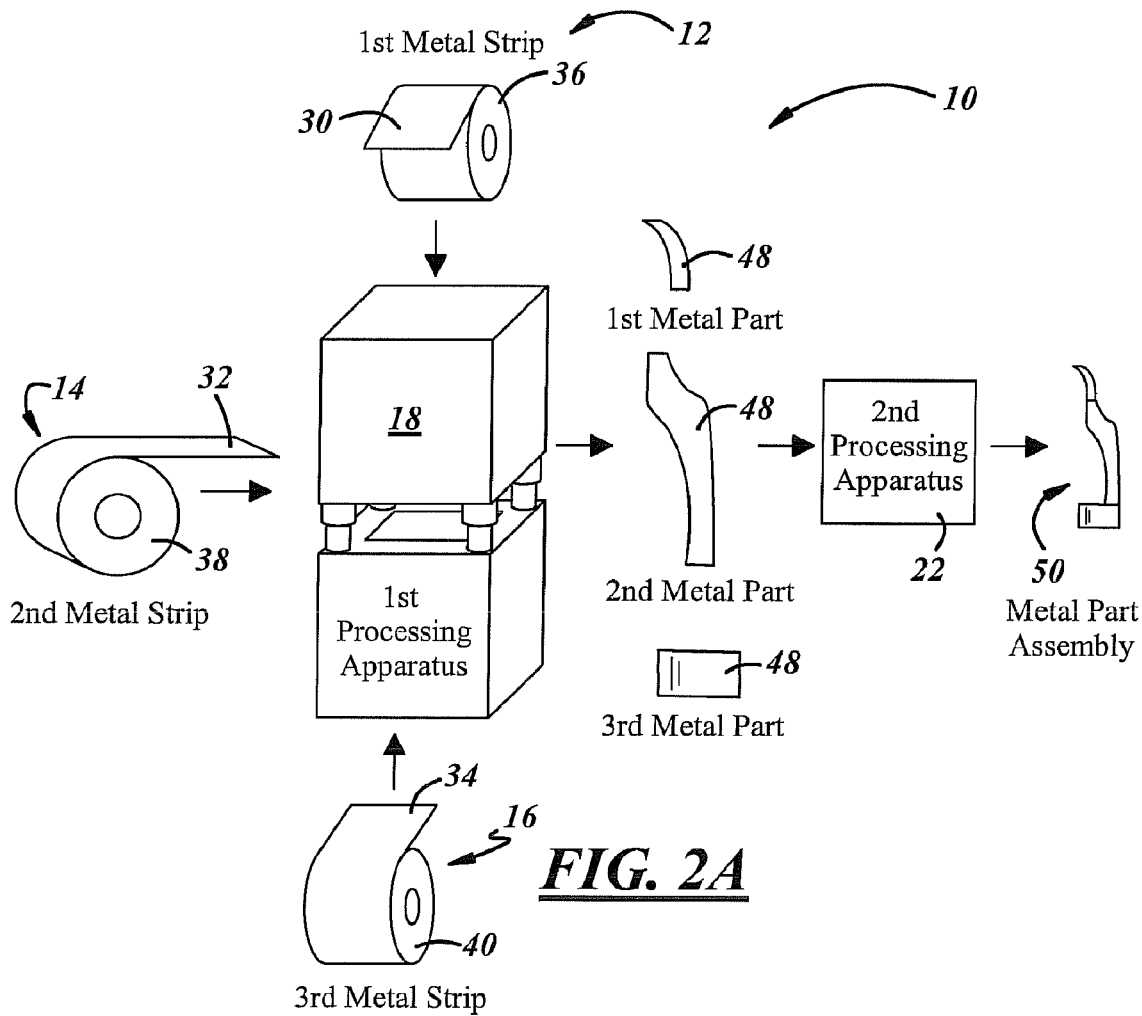
FIGS. 2A-B are schematic illustrations of an exemplary process that may be used with the system from FIG. 1A to manufacture metal parts.
Figure 2B:
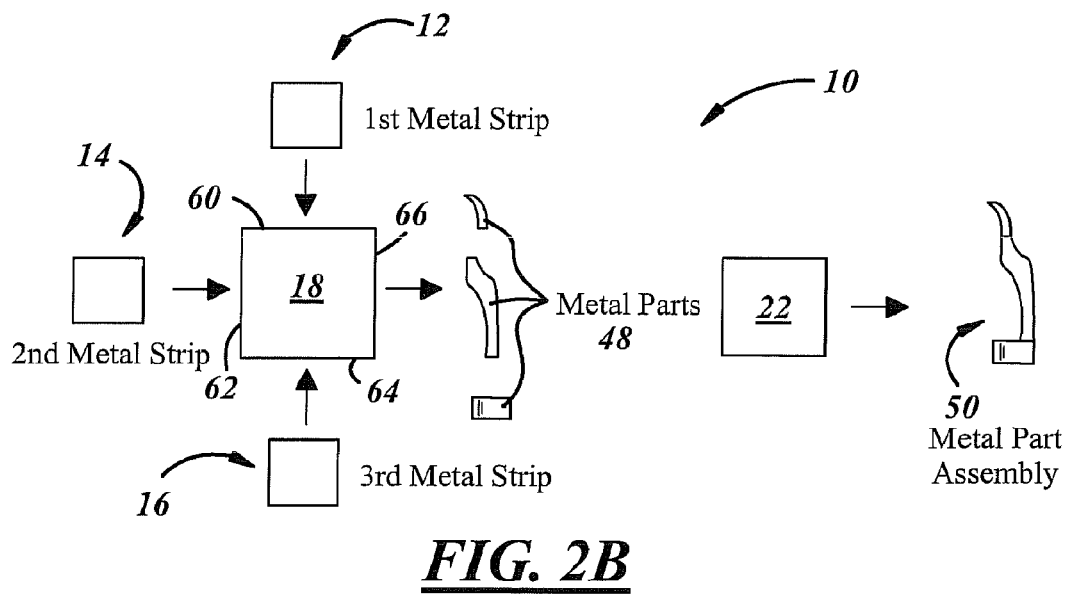

During operation, input material is received from several material sources, multiple metal parts are produced at the same time, and the multiple metal parts are then provided to a downstream operation for subsequent processing. According to an exemplary embodiment of a single process cycle, which is illustrated in FIGS. 2A-B, the present method includes a first step where unwinding apparatuses 12-16 unwind metal coils 36-40 and provide three separate metal strips 30-34 to coil-fed metal forming press 18. Metal strip 30 may be provided to a first input side 60 of press 18, metal strip 32 may be provided to a second input side 62 of press 18, and metal strip 34 may be provided to a third input side 64 of press 18. Next, the method may include a second step where the coil-fed metal forming press 18 creates three separate blanks or metal parts 48 at the same time. In a third step, where part transfer apparatus 20 may retrieve the three blanks 48 from an output side 66 of press 18, and present and/or position them for part assembly apparatus 22 (e.g., a laser welder). Once, the three blanks or metal parts 48 are in place, part assembly apparatus 22 can create a laser welded blank assembly 50 from the three individual blanks. By producing multiple metal parts during the second step and providing the part assembly apparatus 22 with only the parts that it needs during the third step, the exemplary method is able to improve the efficiency of the system (e.g., reduced cycle times versus systems that extract parts from multiple presses, etc.) and reduce the overall cost of the system (e.g., reduces part inventory, storage and transportation expenses associated with inventory, single press versus multiple presses, etc.). A basic illustration of this system and method is further shown in FIGS. 2A-B.

Figure 3A:
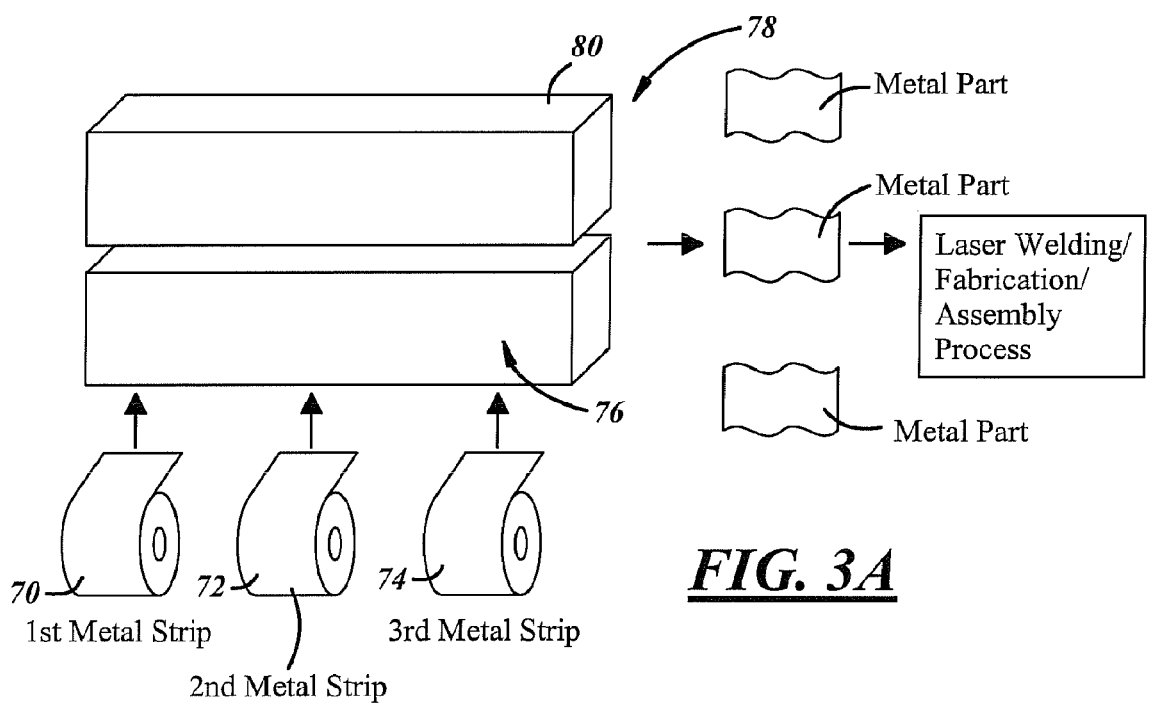
FIGS. 3A-B are schematic illustrations of another exemplary process that may be used to manufacture metal parts.
Figure 3B:
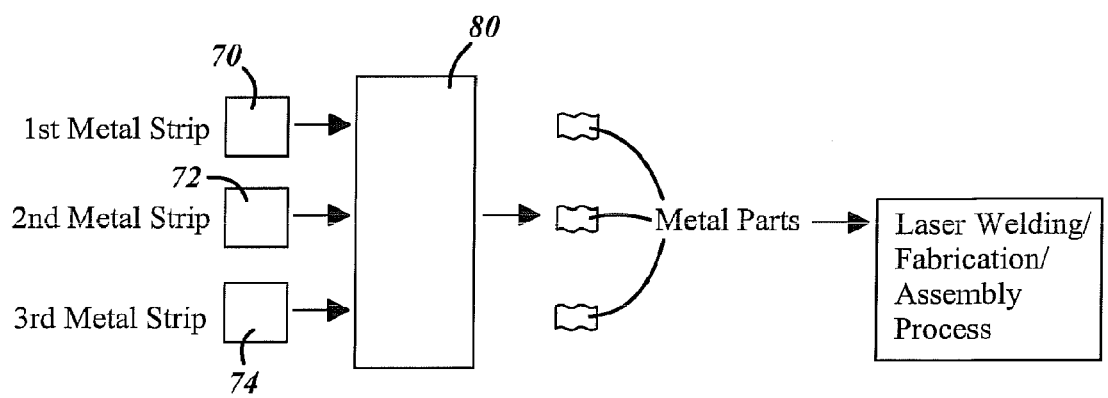

According to another embodiment that is shown in FIGS. 3A-B, multiple material sources are positioned so that they provide several metal strips 70-74 to a single side 76 of an elongated first processing apparatus 80, while the metal parts or output of the first processing apparatus is extracted from a different and dedicated output side 78 of the apparatus. As with the previous examples, the embodiment shown in FIGS. 3A-B may include unwinding apparatuses, a coil-fed metal forming press, a part transfer apparatus, a part assembly apparatus, and/or any other suitable component, device, apparatus, etc.

It is to be understood that the foregoing description is not a definition of the invention itself, but is a description of one or more preferred exemplary embodiments of the invention. The invention is not limited to the particular embodiment(s) disclosed herein. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the apparatus, system and method described herein may utilize any number of material sources, including two, three, four, five material sources, etc. Furthermore, even though the work pieces described above are referred to as "metal parts" and "metal part assemblies," it is certainly possible for such pieces to have non-metallic pieces as well. For instance, a metal part may be combined with one or more plastic or other non-metallic parts at the assembly stage. There is no requirement that the apparatus, system and/or method described herein be limited to exclusively working with metal. All such other embodiments, changes, and modifications are intended to come within the scope of the appended claims.

As used in this specification and claims, the terms "for example", "e.g.," "for instance", "like", and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:
1. A system for manufacturing metal parts, comprising:
a first material source providing a first metal strip from a first metal coil;
a second material source providing a second metal strip from a second metal coil; and a coil-fed metal forming press receiving the first metal strip from the first material source and the second metal strip from the second material source such that the first and second metal strips are adjacent one another in the coil-fed metal forming press, wherein the coil-fed metal forming press forms both the first and second metal strips in a single forming operation such that a plurality of metal parts are formed.

2. The system of claim 1, wherein the first and second metal strips differ from one another in at least one of the following characteristics:
composition, quality, thickness and/or width.

3. The system of claim 1, wherein the coil-fed metal forming press receives the first metal strip on a first input side of the press, receives the second metal strip on a second input side of the press, and presents the formed metal parts on an output side of the press.

4. The system of claim 1, wherein the coil-fed metal forming press receives both the first and second metal strips on a single input side of the press, and presents the formed metal parts on an output side of the press.

5. The system of claim 1, further comprising a third material source providing the coil-fed metal forming press with a third metal strip from a third metal coil.

6. The system of claim 5, wherein the coil-fed metal forming press receives the first metal strip on a first input side of the press, receives the second metal strip on a second input side of the press, receives the third metal strip on a third input side of the press, and presents the formed metal parts on an output side of the press.

7. The system of claim 5, wherein the coil-fed metal forming press receives the first, second and third metal strips on a single input side of the press, and presents the formed metal parts on an output side of the press.

8. The system of claim 1, further comprising a part transfer apparatus and a part assembly apparatus, wherein the part transfer apparatus retrieves the metal parts from the coil-fed metal forming press and presents them to the part assembly apparatus so that the metal parts can be turned into a metal part assembly.

9. The system of claim 1, wherein the coil-fed metal forming press includes a shearing station, a blanking press, or a stamping press.

10. A system for manufacturing metal parts, comprising:
a plurality of metal coils providing a plurality of metal strips, wherein the plurality of metal strips includes a first metal strip provided from a first metal coil and a second metal strip provided from a second metal coil;
a first processing apparatus receiving the plurality of metal strips from the plurality of metal coils such that the first and second metal strips are adjacent one another in the first processing apparatus and transforming the plurality of metal strips into a plurality of metal parts in a single forming operation, wherein the first processing apparatus includes a coil-fed metal forming press;
a part transfer apparatus transferring the plurality of metal parts from the first processing apparatus; and
a second processing apparatus receiving the plurality of metal parts from the part transfer apparatus and creating a metal part assembly from the plurality of metal parts.

11. The system of claim 10, wherein the first and second metal strips differ from one another in at least one of the following characteristics: composition, quality, thickness and/or width.

12. The system of claim 10, wherein the first processing apparatus receives a first metal strip on a first input side of the press, receives a second metal strip on a second input side of the press, and presents the formed metal parts on an output side of the press.

13. The system of claim 10, wherein the first processing apparatus receives first and second metal strips on a single input side of the press, and presents the formed metal parts on an output side of the press.

14. The system of claim 10, wherein the first processing apparatus, the part transfer apparatus, and the second processing apparatus are all operating together according to an overall takt time for the manufacturing system.

15. The system of claim 10, wherein the first processing apparatus includes a shearing station, a blanking press, or a stamping press, and the second processing apparatus includes a welding device or an adhesive station.

16. A method for manufacturing metal parts with a system having a first material source, a second material source and a coil-fed metal forming press, the method comprising the steps of:
(a) providing a first metal strip from a first metal coil of the first material source to the coil-fed metal forming press;
(b) providing a second metal strip from a second metal coil of the second material source to the coil-fed forming press such that the first and second metal strips are adjacent one another in the coil-fed metal forming press;
(c) forming both the first metal strip and the second metal strip with the coil-fed forming press in a single forming operation such that a plurality of metal parts are simultaneously formed; and
(d) transferring the plurality of metal parts from the coil-fed press to a subsequent operation according to an overall takt time for the manufacturing method.

17. The method of claim 16, wherein the first and second metal strips differ from one another in at least one of the following characteristics:
composition, quality, thickness and/or width.

18. The method of claim 16, wherein step (c) further comprises receiving the first metal strip on a first input side of the press, receiving the second metal strip on a second input side of the press, and presenting formed metal parts on an output side of the press.

19. The method of claim 16, wherein step (c) further comprises receiving both the first and second metal strips on a single input side of the press, and presenting formed metal parts on an output side of the press.

20. The method of claim 16, further comprising the step of:
providing a third metal strip from a third metal coil to the coil-fed metal forming press.

21. The method of claim 16, wherein step (d) further comprises transferring the plurality of metal parts from the coil-fed press to a part assembly apparatus, and creating a metal part assembly from the plurality of metal parts.

* * * * *